United States Patent Office 2,868,810
Patented Jan. 13, 1959

2,868,810

EPIPREGNANOLONE - BENZOPHENONE ADDUCT AND METHODS FOR PRODUCING AND UTILIZING SAME

Kekhusroo R. Bharucha, Toronto, Ontario, Canada, assignor to Canada Packers, Limited, Toronto, Ontario, Canada No Drawing. Application November 29, 1956
Serial No. 624,971

18 Claims. (Cl. 260—397.4)

This invention relates to an adduct of epipregnanolone and benzophenone, to methods for producing such adduct, and to methods for the production of epipregnanolone involving the production and use of such adduct as an intermediate compound.

The novel adduct and methods of the invention find particular utility in the synthesis of epipregnanolone and other useful steroid compounds from bile acids. For example, when lithocholic acid is treated by the Meystre-Miescher process (Fieser and Fieser, "Natural Products Related to Phenanthrene," Reinhold Publishing Corporation, New York, 1949, pages 397–8) for degradation of the 17-side chain to the 20-keto steroid, a crude, gummy or oil oxidation product results from which it is substantially impossible to obtain epipregnanolone in a satisfactory yield. The final oxidation of the degradation reaction for production of epipregnanolone apparently proceeds according to the following equation:

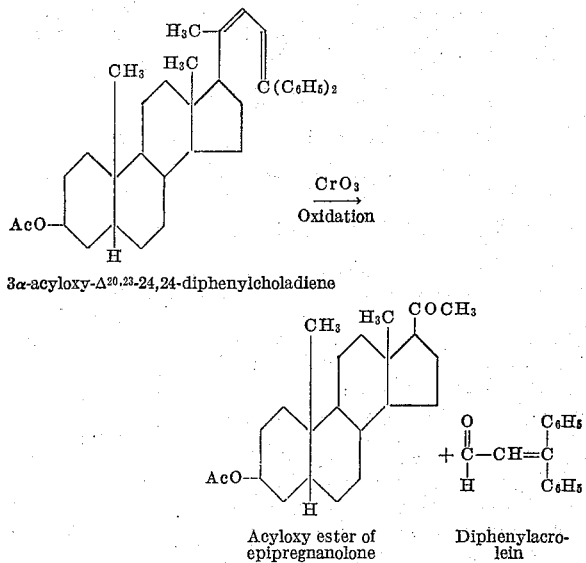

3α-acyloxy-Δ20,23-24,24-diphenylcholadiene

Acyloxy ester of epipregnanolone + Diphenylacrolein

Epipregnanolone is extremely difficult to recovery from the reaction products either as the ester or after hydrolysis of the reaction products to replace the 3α-acyloxy group of the steroid with the 3α-hydroxy group. It has now been found that if the oxidation of a 3α-acyloxy-Δ20,23-24,24-diphenylcholadiene is carried out under sufficiently vigorous conditions, it is possible to produce an adduct of epipregnanolone and benzophenone which can be readily separated from the reaction mixture, purified if desired, and then cleaved to produce epipregnanolone in relatively high yields. During the course of the vigorous oxidation reaction, the diphenylacrolein is apparently oxidized to benzophenone and a two-carbon fragment—perhaps oxalic acid. Upon hydrolysis of the epipregnanolone ester reaction product to replace the 3-acyloxy group of the steroid with a 3-hydroxyl group, an epipregnanolone-benzophenone adduct, which may be readily crystallized and purified, results. This adduct may be given the following approximate formula:

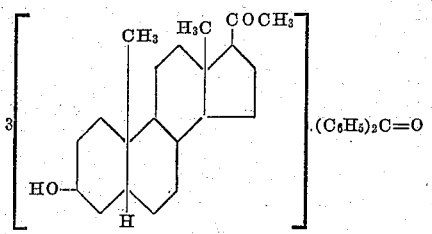

The novel adduct has a melting point in the range of 128 to 132° C., and exhibits a peak at 2530 A. in the ultraviolet absorption spectrum. While applicant does not intend to be bound by the exact formula given above, the results of elemental analysis, polarimetric measurements, and light-absorption data are consistent with the postulation that the molecular ratio of the steroid to benzophenone in the adduct approximates 3:1. From these data, it appears that the adduct may best be classified among the clathrates, or inclusion type of compounds. The epipregnanolone-benzophenone adduct is quite stable, even to heat, being recovered unchanged after drying at 100° C./10 mm. absolute pressure for 14 hours.

The novel adduct of the invention may also be made directly by reacting benzophenone with epipregnanolone in an organic solvent mixture, followed by crystallization of the adduct from such mixture. The superior physical and crystallizing properties of the adduct compared to epipregnanolone and the ready recovery of the steroid from such adduct by means of steam distillation or extraction procedures hereinafter set forth, make the production of such adduct an extremely important technique in the isolation of epipregnanolone from crude reaction mixtures, either by direct production of the adduct from the initial diphenyl steroid, or by the addition of extraneous benzophenone where the epipregnanolone-producing reaction has been carried out under such conditions precluding formation of benzophenone. Isolation of epipregnanolone from any mixture containing same by forming the adduct and separating it from the mixture is contemplated by the invention.

Accordingly, it is an object of the invention to provide a novel process for recovering epipregnanolone from crude mixtures containing epipregnanolone, its derivatives, or adduct.

Another object of the invention is to provide an improvement in the synthesis of epipregnanolone from lithocholic acid whereby high yields may be obtained.

Another object of the invention is to provide a method for the production of an epipregnanolone-benzophenone adduct from 3α-acyloxy-Δ20,23-24,24-diphenylchloadiene.

Another object of the invention is to provide methods for the treatment of an epipregnanolone-benzophenone adduct for recovery of epipregnanolone.

A still further object of the invention is to provide a novel epipregnanolone adduct.

The process of the invention, in one of its aspects, comprises the oxidation of a 3α-acyloxy-Δ20,23-24,24-diphenylcholadiene with an oxidizing agent such as chromium trioxide ($CrO_3$) or potassium permanganate under conditions sufficiently vigorous to produce benzophenone as an oxidation product, subsequent hydrolysis of the acyloxy group at the 3α position of the steroid to a hydroxyl group, with simultaneous production of epipregnanolone-benzophenone adduct, isolation of such adduct, purification of the crude adduct by crystallization from suitable solvents, and finally the cleaving of the purified adduct to produce epipregnanolone. By this method, yields of 75% and higher based on the quantity of diphenyldiene steroid in the starting material are readily obtained.

While it is possible that other oxidizing agents, such as ozone and the like might be employed, $CrO_3$ and potassium permanganate are the preferred oxidants, potassium permanganate being especially useful since the reaction conditions may be more carefully controlled with this oxidizing agent. In carrying out the reaction with potassium permanganate, a 3α-acyloxy-$\Delta^{20,23}$-24,24-diphenylcholadiene, produced, for example, from lithocholic acid by the method described in Fieser and Fieser, supra, may be mixed with finely powdered $KMnO_4$ in a suitable reaction medium. While a number of organic solvents may be used for this purpose, aqueous acetone has been found to be particularly satisfactory. During the course of the reaction the potassium permanganate makes oxygen available and forms $MnO_2$ and KOH. In order to minimize side reactions due to the presence of the strong base, a suitable neutralizing agent may be utilized to maintain the reaction conditions substantially neutral. Magnesium sulfate may be used for this purpose, reacting with the KOH formed to provide $K_2SO_4$ and to precipitate insoluble $Mg(OH)_2$. Other neutralizing agents, including free acids such as acetic, as well as acid salts and buffers, may be employed for this purpose if desired. The reaction is exothermic, and the temperature during such reaction is preferably maintained at about 35° C.–45° C., although satisfactory yields are obtained at temperatures as high as 65° C., the reflux temperature of the acetone. After the reaction has been completed, excess oxidizing agent may be destroyed by addition of a suitable reducing agent such as charcoal, methanol, or the like, and the reaction mixture may then be filtered, with the aid of a filter-aid if necessary, to remove the precipitated matter. The filtrate may then be evaporated to provide a crude reaction product in the form of a yellow oil or gum which apparently contains 3α-acyloxy epipregnanolone and benzophenone. This reaction product is then hydrolyzed by an acid in an alcoholic solution to replace the 3α-acyloxy group of the steroid with a 3α-hydroxy group, simultaneously producing the epipregnanolone-benzophenone adduct.

After the hydrolysis, the excess acid may be neutralized by addition of a suitable alkali, such as sodium carbonate or the like, following which the crude epipregnanolone-benzophenone adduct is separated from the solvent—as by evaporation of the solvent in vacuo at room temperature. The crude adduct is then purified by dissolution in an organic solvent such as methylene chloride, methanol, acetone, n-hexane, ether, or mixtures thereof, and recrystallization therefrom.

Where chromic acid ($CrO_3$) is utilized for the oxidation, the 3α-acyloxy-$\Delta^{20,23}$-24,24-diphenylcholadiene may be mixed with the $CrO_3$ in an organic reaction medium containing acetic acid. The reaction temperature is maintained in the order of 0° C. Excess oxidizing agent is destroyed upon completion of the oxidation reaction by addition of a reducing agent such as sodium bisulphite, the solvents are removed in vacuo, and the residue hydrolized with an alcoholic solution of hydrochloric acid to provide the epipregnanolone-benzophenone adduct. This adduct may be purified by crystallization from solvents or solvent mixtures in the manner described above.

Several methods may be utilized for cleaving the epipregnanolone-benzophenone adduct; namely, (1) by steam distillation, (2) by extraction with phosphoric acid. Steam distillation of solution or suspension of the adduct provides an effective and inexpensive method for producing the epipregnanolone steroid. Steam distillation may be carried out either on an aqueous suspension or upon a solution of the adduct in organic solvents. The purity of the product is dependent upon the length of time the material is subjected to steam distillation, a substantially pure product being obtained by subjecting the adduct to steam distillation for a period of about four hours. Shorter time periods for the steam distillation operation may be utilized, but the product may contain small amounts of benzophenone.

The phosphoric acid extraction method for removing the epipregnanolone from the adduct, in general, comprises suspending the adduct in an organic solvent such as n-hexane, extracting such suspension with orthophosphoric acid which may be of a commercial grade (85%), and finally pouring the acid extract into a large volume of cold water, whereupon the epipregnanolone separates as a colorless crystalline mass. The $H_3PO_4$ apparently displaces benzophenone from the adduct, presumably itself forming a complex with the steroid via the hydroxy grouping. The benzophenone remains in the n-hexane phase, while the epipregnanolone is recovered by breaking up the phosphoric acid-steroid complex when the acid solution is poured into cold water. This process may be improved by utilizing a mixture of n-hexane and ethyl acetate, in for example approximately 1 to 2 proportions, as the initial medium from which the epipregnanolone is extracted with the phosphoric acid. The use of ethyl acetate provides a clear solution, whereas with n-hexane alone some of the adduct may remain in suspension. The purity of the final epipregnanolone product can be improved by washing the phosphoric acid extract several times with n-hexane to completely eliminate the benzophenone. It will be understood that in large-scale operations the phosphoric acid solution might be continuously extracted with n-hexane.

The invention will be further understood by reference to the following examples of practice. In the examples all optical rotations were carried out in alcohol-free chloroform, and all spectrophotometric measurements were in ethanol, unless otherwise stated.

EXAMPLE 1

*Permanganate oxidation of pure diene*

To a suspension of 3α-acetoxy-$\Delta^{20,23}$-24,24-diphenylcholadiene (10 g.; $E^{1\%}_{1cm.}$—512 in isooctane, indicating purity of 100%)

and $MgSO_4.7H_2O$ (10 g.) in acetone (150 cc.) and water (10 cc.) warmed to 45° C. (internal temperature), finely powdered $KMnO_4$ (12 g.) was added at 5 minute intervals in 3 gm. lots. There was evolution of heat and the temperature maintained itself between 45°–50° C. After about 15 minutes, additional $KMnO_4$ (2 g.) was added and the mixture allowed to come to room temperature during the next 2 hours. A further amount of $KMnO_4$(1 g.) (total $KMnO_4$=15 g.) was added and the stirring continued for additional 2 hours. "Darco" charcoal (1 g.) was then added and the stirring continued for another 30 minutes to destroy all excess oxidizing agent. The mixture was then filtered with the aid of "celite" filter-aid and the precipitated $MnO_2$ washed well with boiling acetone. The filtrate was evaporated to dryness, the residue taken up in methanol (25 cc.) and the solution again evaporated to dryness in vacuo on a boiling water-bath to give a yellow oil (9.15 g.). The latter was dissolved in methanol (100 cc.) and water (2 cc.) and treated with conc. HCl (2.5 cc.) to hydrolyze the 3-acetoxy group of the steroid. After allowing to stand at room temperature for 24 hours, the acid was destroyed by addition of solid anhydrous $Na_2CO_3$. After evaporation of the solvent in vacuo at room temperature, the residue was dissolved in $CHCl_3$ and filtered from inorganic salts. Evaporation of the $CHCl_3$ solution left a yellow solid (8.3 g.). Crystallization from ether gave a crop of well defined crystals of epipregnanolone-benzophenone adduct having a melting point of 126–130° C. with prior softening at 121° C.; $[\alpha]_D^{27}$ +84.57

(c.=1.53). Crystallization from n-hexane raised the melting point to 127.5–130° C. with sintering around 124° C. Recrystallization from aqueous methanol gave colorless needles, M. P. 128–130° C. (127° sinters). In near infrared region, the product showed a peak at 2.75$\mu$ (unassociated OH bond) in $CCl_4$ solution. Further treatment of the mother liquors provided additional crops of crystals of the same product. The total quantity of crystalline material recovered amounted to 5.11 gms.

EXAMPLE 2

*Permanganate oxidation of pure diene*

To a stirred suspension of powdered $KMnO_4$ (20 g.) and $MgSO_4.7H_2O$ (10 g.) in acetone (150 cc.) and water (10 cc.) at 27° C., 3($\alpha$)-acetoxy-$\Delta^{20,23}$-24,24-diphenylcholadiene (10 g.; $\lambda$ max. 3050 A., $\epsilon$ 27,300 in isooctane) was added in three nearly equal lots at 5 minute intervals. An exothermic reaction ensued and acetone refluxed gently. After 30 minutes from completion of addition, when the reaction temperature had fallen to 35° C., no excess oxidizing agent could be detected. Additional $KMnO_4$ (3 g.) was therefore added and the stirring continued at 35°–30° C. for another 4 hours. At this stage, the reaction was terminated by adding activated charcoal (1 g.). The mixture was then filtered through a bed of filter-aid and the residue washed well with acetone. Evaporation of the combined filtrate, dissolution of the residue in methanol (25 cc.) and again evaporation to dryness in vacuo left a crude mixture of 3$\alpha$-acetoxy epipregnanolone and benzophenone as a gum (8.55 g.).

For hydrolysis, a solution of the latter in methanol (100 cc.), water (2 cc.) and conc. HCl (2.5 cc.) was kept at 27° for 24 hours. After neutralization of the acid by addition of solid anhydrous $Na_2CO_3$, the solvents were stripped off in vacuo at room temperature. Extraction of the residue with hot $CHCl_3$, filtration and evaporation left a pale yellow semi-solid (7.65 g.). Crystallization from a mixture of ether and n-hexane then gave epipregnanolene-benzophenone adduct as a colorless solid (4.9 g.), M. P. 127–130° C. with previous sintering, $[\alpha]_D^{26}$ +80.2±4 (c., 0.832), $\lambda$ max. 253 A.

($E_{1 cm.}^{1\%}$ 190)

Recrystallization of a portion (272 mg.) from n-hexane yielded 210 mg. with M. P. 127–130° C., $[\alpha]_D^{26}$ +83.5±4 (c., 1.035), $\lambda$ max. 2530 A.

($E_{1 cm.}^{1\%}$ 185)

$\lambda$ min. 2270 A.

($E_{1 cm.}^{1\%}$ 61)

A further crystallization from aqueous methanol did not alter the physical constants. A mixture melting point with a sample of synethetic adduct prepared directly from pure epipregnanolone and benzophenone was undepressed.

Concentration of the mother liquors from the first crystallization furnished further crystal crops of the same product.

EXAMPLE 3

*Permanganate oxidation of crude diene*

A more easily controlled oxidation was obtained by reducing the amount of water present to about one-tenth that in the foregoing examples. One-half of the former amount of $MgSO_4.7H_2O$ was sufficient. The crude adduct was recrystallized from methylene dichloride and hexane. The procedure was carried out as follows:

To a stirred suspension of 3($\alpha$) acetoxy-$\Delta^{20,23}$-24,24-diphenylcholadiene (64 gms. 79.8% pure obtained by Ziegler bromination and dehydrohalogenation of the corresponding diphenylethylene) and $MgSO_4.7H_2O$ (32 gms.) in acetone (850 ml.) and water (6.65 ml.), finely powdered $KMnO_4$ (107 gms.) was added in 6 portions over a half hour period. Heat was evolved and the reaction maintained itself at the boiling point of acetone. The mixture was stirred for four hours without external heating and then the excess $KMnO_4$ was destroyed by the addition of 4 gms. of Darco "KB" charcoal. The mixture was filtered through a bed of Celite "503" and the precipitated $MnO_2$ washed well with boiling acetone. The filtrate and washings were evaporated to dryness. The residue was taken up in methanol (100 ml.) and the solution again brought to dryness in vacuo to yield 54 gms. of a yellow viscous oil. A precipitate formed when the latter was treated with hot methanol (670 ml.). The mixture was filtered and the precipitate washed well with methanol. [The insoluble material (3.103 gms.) appeared to be an adduct of the initial diphenylethylene steroid from which the diphenyldiene steroid starting material was produced with a portion of such diene, i. e., such adduct apparently is formed during the Ziegler conversion and constitutes an impurity in the crude diene. The ethylene-diene steroid adduct when recrystallized from the ethyl acetate and methanol gave well defined crystals having a melting point of 160–161° C., undepressed on admixture with an authentic sample prepared from the components in ethyl acetate. The U. V. spectra of both the specimens were identical.] To the filtrate were added water (15 ml.) and concentrated HCl (17 ml.) and the solution kept at room temperature for 23 hours for hydrolysis of the 3$\alpha$-acetoxy group of the steroid. A further precipitate formed which was removed by filtration (0.995 gm. M. P. 148–150° C. probably hydrolyzed ethylene-diene adduct). The acid was destroyed by the addition of solid $Na_2CO_3$ (15 gms.) and the mixture evaporated to dryness in vacuo at room temperature.

The crude epipregnanolone-benzophenone adduct was separated from the inorganic solids by extracting with methylene dichloride (250 ml.) and filtration. The filter cake was washed with methylene dichloride, and the filtrate and washings (300 ml.) were evaporated on a steam bath to one-quarter volume. Hexane (250 ml.) was added and the warm solution seeded. After being refrigerated overnight the crystals were filtered and washed with hexane (50 ml.) and ether-hexane (1:10; 50 ml.) and dried to constant weight in vacuo at 70° C.

The weight yield was 26.42 gms. (M. P. 125–127° C. with sintering at 122° C.).

$[\alpha]_D^{29}$ = +81.4°(C=0.832)

$E_{1 cm.}^{1\%}$ 2530 A.—201

Benzophenone content=18.3%

A second crystal crop of the same product amounting to 6.1 gms. was obtained by further treatment of the mother liquor.

EXAMPLE 4

*Chromic acid oxidation of crude diene*

3($\alpha$) - acetoxy - $\Delta^{20,23}$-24,24 - diphenylcholadiene (17 g.; 87% pure) was dissolved in 80% acetic acid (200 ml.) and chloroform (150 ml.). This solution was cooled to 0° C. and then there was added within 20 minutes a solution of chromic acid (15 g.) in 80% acetic acid (200 ml.). The mixture was stirred at 0° C. for a period of 4 hours, the excess oxidizing agent was destroyed by addition of sodium bisulphite, the solvents were removed in vacuo and the residue taken up in ether and water. The aqueous phase was extracted exhaustively with ether, the combined solvent extracts were washed wtih water and evaporated to dryness. This residue (19.3 g.) was hydrolyzed at 20° C. for 20 hours with methanol (170 ml.) and conc. hydrochloric acid (2.6 ml.). The mixture was neutralized by addition of sodium bicarbonate and most of the methanol was removed. The residue was then taken up in ether and saturated salt solution, the organic phase was washed with salt solution, dried, and evaporated to give a residue (17.3 g.) which crystallized from hexane-ether to yield 7.2 g. of epipregnanolone-benzophenone adduct. A second crop gave an additional 1.08 g. of epipregnanolone adduct; considering that this complex contains 20% of benzophenone, the yield on the basis of epipregnanolone was 75% of the theoretical with respect to the quantity of diene in the starting material.

EXAMPLE 5

*Chromic acid oxidation of pure diene*

This experiment was carried out as described in Example 4, but with 15 grams of 98% diene as the starting material. The product epipregnanolone-benzophenone adduct was obtained in three crops (6.31 grams). The adduct was broken up by steam distillation (see Example 7) and the epipregnanolone crystallized from hexane-ether, M. P. 149–151° C., $[\alpha]_D^{31}+107°$.

EXAMPLE 6

*Synthetic epipregnanolone-benzophenone adduct*

A solution of epipregnanolone (240 mg.) and benzophenone (60 mg.) in ether (10 cc.) was concentrated to the crystallization point and then chilled, whereupon it deposited colorless slender needles (197 mg.) M. P. 131–132° C. (128° sinters). Crystllization from n-hexane gave M. P. 131–132° C. (129° sinters), $[\alpha]_D^{26}+89.04\pm4$ (c., 1.035)

λ max. 2530 A. ($E_{1cm.}^{1\%}$ 176) λ min. 2270 A. ($E_{1cm.}^{1\%}$ 59)

Found: C, 79.98%; H, 10.05%; O, 9.86%

$$3C_{21}H_{34}O_2 \cdot C_{13}H_{10}O$$

requires C, 80.3%; H, 9.86%; O, 9.86%, $[\alpha]_D+91.5\%$;

$$E_{1cm.}^{1\%} (253\ mu) = 176$$

EXAMPLE 7

*Cleavage of epipregnanolone-benzophenone adduct with steam*

An aqueous suspension of epipregnanolone-benzophenone adduct was steam distilled for 4½ hours. Isolation of the nonvolatile residue by filtration and crystallization from a mixture of ether and n-hexane gave pure epipregnanolone in rosette of needles, M. P. 149–151° C., $[\alpha]_D^{25}+109.07\pm4$ (c., 0.871). Found: C, 79.26%; H, 10.81%; O, 10.25%. Calculated for $C_{21}H_{34}O_2$, C, 79.19%; H, 10.76%; O, 10.06%.) Meystre and Miescher, Helvetica Chimica Acta, 29, 33 (1946), give melting point 151–154° C., $[\alpha]_D^{22}+109.5°\pm4$.

EXAMPLE 8

*Cleavage of epipregnanolone-benzophenone adduct with steam*

A solution of the adduct (2.74 g.; M. P. 125–130° C. with prior softening at 120° C.; $[\alpha]_D^{28}+81$, c.=1.84;

$$E_{1cm.}^{1\%}\ 253\ mu = 203$$

indicating ca. 18% benzophenone) in methanol was steam distilled for 1½ hours. On cooling, the nonvolatile solid was filtered off and dried at 65° and at 10 mm. for 18 hours. Yield: 2.57 g.; M. P. 133–144° $[\alpha]_D^{29}+97.8$ (c. =1.482)

$$E_{1cm.}^{1\%}\ 2530\ A. = 47$$

indicating ca. 4% benzophenone.

EXAMPLE 9

An aqueous suspension of the above adduct (Example 8) (3.28 g.) was steam distilled for one hour. Isolation as above yielded 2.81 g., M. P. 126–139° C. $[\alpha]_D^{28}+95.6$ (c.=0.985)

$$E_{1cm.}^{1\%}\ 2530\ A. = 125$$

indicating ca. 11% benzophenone.

EXAMPLE 10

*$H_3PO_4$ extraction of epipregnanolone from epipregnanolone-benzophenone adduct*

A suspension of crude epipregnanolone-benzophenone adduct (1.0 g.) M. P. 127–130° C. (123° sinters), $[\alpha]_D^{26}+80.2$ (c.=0.832), light absorption: Maximum $$E_{1cm.}^{1\%}\ 253\ mu = 190$$

(indicating 17% benzophenone), in n-hexane, was extracted thrice with commercial (85%) $H_3PO_4$. The combined acid extracts were poured with hand-stirring into a large volume of cold tap water, whereupon a colorless crystalline mass immediately separated. It was filtered off, washed with $NaHCO_3$ solution, with water, and then dried at 68° C./10 mm. absolute for 15 hours. Yield: 0.865 g., M. P. 129–139° C. (116° softens), U. V. light absorption:

$$E_{1cm.}^{1\%}\ 253\ mu = 106$$

indicating 9.7% benzophenone.

EXAMPLE 11

*$H_3PO_4$ extraction of epipregnanolone from epipregnanolone-benzophenone adduct*

A solution of the adduct (1 g.) in a mixture of n-hexane and ethyl acetate was extracted twice with commercial $H_3PO_4$. The combined acid extracts were washed once with a mixture of n-hexane and ethyl acetate and then poured into cold tap-water. The resulting colorless solid was filtered off, washed with dilute $NaHCO_3$ solution, water, and dried at 74° C./10 mm. for 18 hours. Yield: 0.745 g., M. P. 138–145° C. (125° C. softens) $[\alpha]_D^{26}+100.1$ (c.=0.821); U. V. light absorption in ethanol:

$$E_{1cm.}^{1\%}\ 252\ mu = 30.1$$

indicating 2.5% benzophenone.

EXAMPLE 12

25 gm. of crude adduct, melting point 107–116° C., $[\alpha]_D^{26}+68.4$ ($E_{1cm.}^{1\%}$ 2530 A.=190 indicating about 17% benzophenone) was dissolved in 140 cc. hot ethyl acetate in a 2-litre separatory funnel. $H_3PO_4$ (250 cc.; 85% commercial) and 1 litre of n-hexane were added and the mixture vigorously shaken. The $H_3PO_4$ layer was separated and extracted twice with 1 litre of hexane (each time). The lower layer of $H_3PO_4$ was poured slowly into 2 litres of cold tap water with stirring. The granular precipitate was filtered off, washed with water, dilute $NaHCO_3$ solution, and again with water to neutrality. Yield: 16.2 gm. of epipregnanolone, transparent in the ultraviolet region indicating complete absence of benzophenone. $[\alpha]_D^{26}+92.7°$ (c.=0.840).

It will be understood that the amounts of the various reagents and the amounts and types of solvents employed in carrying out the processes of the invention, the temperatures employed and other reaction conditions are subject to variation within the limits obvious to those skilled in the art. Hence various changes may be made in accordance with the principles set forth herein and in the claims annexed hereto.

I claim:

1. An adduct of benzophenone and epipregnanolone.

2. A method for the production of an adduct of benzophenone and epipregnanolone from a 3α-acyloxy-Δ$^{20,23}$-24,24-diphenylcholadiene, comprising the steps of subjecting said diphenylcholadiene to the action of an oxidizing agent to provide a reaction product including a 3α-acyloxy-20-keto steroid and benzophenone, hydrolyzing said reaction product to produce an epipregnanolone-benzophenone adduct, and isolating said adduct from the reaction mixture.

3. The process steps as defined in claim 2, wherein the epipregnanolone-benzophenone adduct formed by the hydrolysis step is separated from the solvent medium empolyed during such step and is purified by dissolution in an organic solvent and crystallization therefrom.

4. The steps defined in claim 2, in which said oxidation reaction is carried out by treatment of the diphenylcholadiene with a permanganate in an aqueous acetone medium.

5. The steps defined in claim 2, in which said oxidation reaction is carried out by treatment of the diphenylcholadiene with chromic acid in an acetic acid medium.

6. A method for the production of epipregnanolone, comprising: treating 3α - acyloxy - Δ$^{20,23}$ - 24,24-diphenylcholadiene with an oxidizing agent to split the conjugated double bonds and to form a reaction product containing benzophenone and 3α-acyloxy-epipregnanolone, subjecting said reaction product to hydrolysis to replace the 3α-acyloxy group of the steroid with a 3α-hydroxy group thereby forming an adduct of benzophenone and epipregnanolone, isolating said adduct, and cleaving said adduct to produce epipregnanolone.

7. The method of claim 6, wherein the cleaving of said benzophenone-epipregnanolone adduct is carried out by steam distillation of an aqueous suspension of said adduct.

8. The method of claim 6, wherein the cleaving of said benzophenone-epipregnanolone adduct is carried out by steam distillation of a solution of said adduct in an organic solvent.

9. The method of claim 6, wherein the cleaving of said benzophenone-epipregnanolone adduct is carried out by extraction with phosphoric acid from an organic solvent.

10. The method of claim 6, wherein said epipregnanolone-benzophenone adduct is purified by recrystallization from an organic solvent prior to the cleaving step.

11. A method for the production of an adduct of epipregnanolone and benzophenone, comprising: oxidizing 3α-acetoxy-Δ$^{20,23}$-24,24-diphenylcholadiene with potassium permanganate in an aqueous-acetone reaction medium while maintaining the reaction temperature in the range of from about 30° C. to the reflux temperature of acetone, destroying excess oxidizing agent, separating the solution from the insoluble residue, evaporing said solution and recovering a non-volatile residue, subjecting said non-volatile residue to acid hydrolysis in an alcoholic solvent medium, neutralizing excess acid, evaporating the solvent, and extracting epipregnanolone-benzophenone from the residue.

12. The process of claim 11, wherein magnesium sulfate is added to the reaction medium to maintain the oxidation reaction under substantially neutral conditions.

13. The process of claim 11, wherein the epipregnanolone-benzophenone adduct is extracted from the final residue by a methylene chloride solvent and the adduct is purified by recrystallization from n-hexane.

14. A method for the production of an adduct of epipregnanolone and benzophenone comprising, dissolving 3α-acetoxy-Δ$^{20,23}$-24,24-diphenylcholadiene is a mixture of acetic acid and an organic solvent, adding chromic acid to the resulting solution and maintaining the reaction mass at a temperature of approximately 0° C. for approximately four hours, destroying excess oxidizing agent, evaporating the solution and extracting the residue with an organic solvent, evaporating the extract to dryness, subjecting the residue to acid hydrolysis in an alcoholic medium, neutralizing excess acid, removing the solvent, redissolving the residue in ether, and crystallizing said benzophenone-epipregnanolone adduct from the ether solution.

15. In a process for recovering epipregnanolone from a crude material containing same, the steps comprising mixing said crude material with benzophenone in an organic solvent, crystallizing a benzophenone-epipregnanolone adduct from said solvent, and cleaving said adduct to produce epipregnanolone.

16. A method for production of epipregnanolone from a benzophenone-epipregnanolone adduct comprising suspending said adduct in an aqueous medium, steam distilling said suspension, dissolving the insoluble residue in an organic solvent, and crystallizing epipregnanolone from said solvent.

17. A method for the production of epipregnanolone from a benzophenone-epipregnanolone adduct comprising extracting said adduct in n-hexane with orthophosphoric acid, and introducing the resulting phosphoric acid extract into water to crystallize epipregnanolone.

18. The method of claim 17, wherein ethyl acetate is mixed with the n-hexane and said adduct is dissolved in the resultant solvent mixture.

No references cited.